Nov. 25, 1941.   T. BAKER ET AL   2,264,157
LOADING AND UNLOADING DEVICE
Filed Nov. 6, 1939
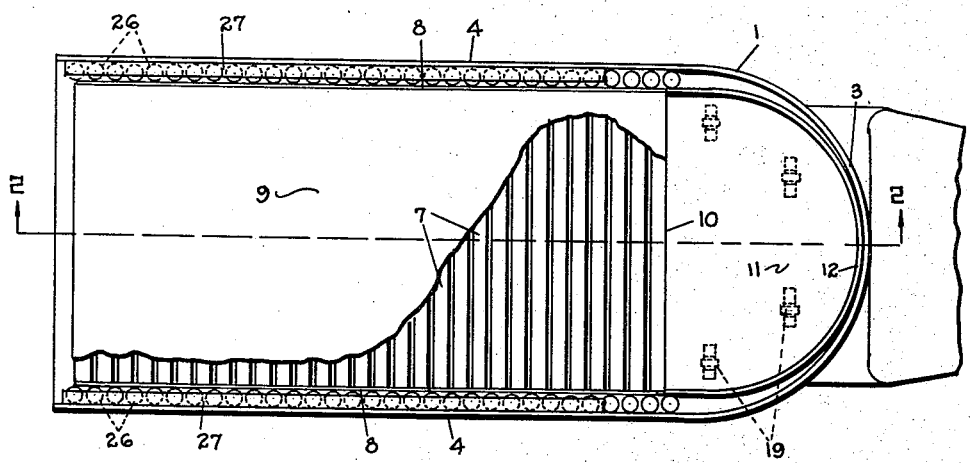
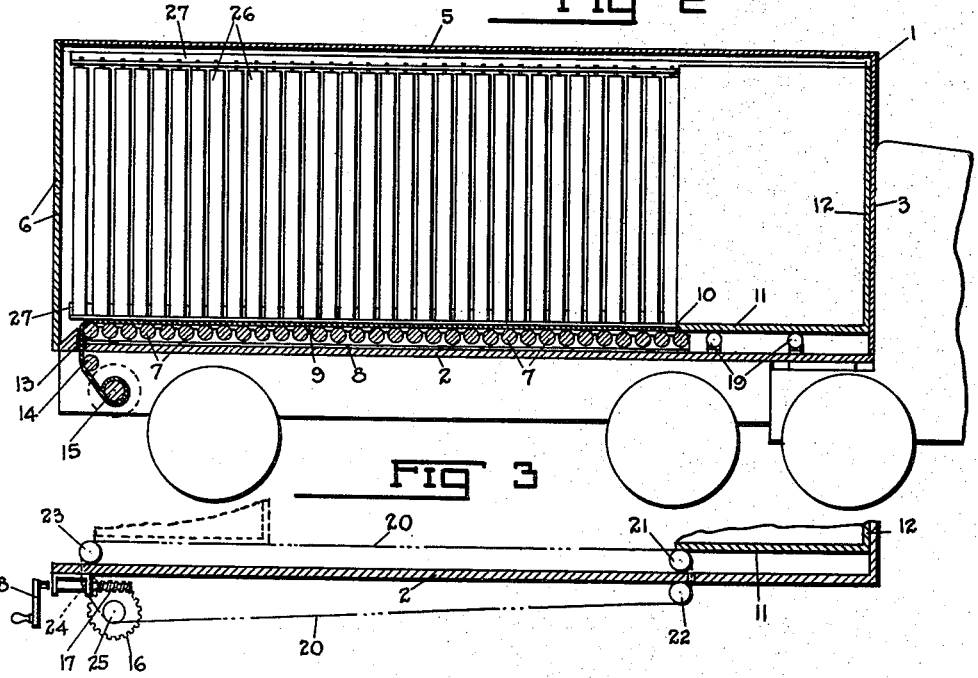
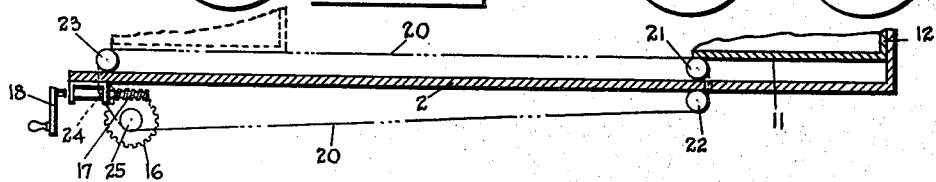
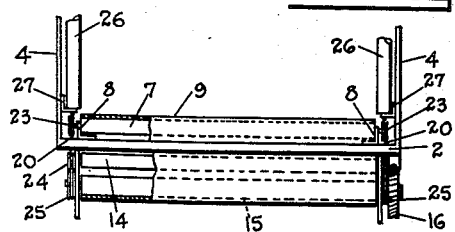
INVENTORS
TRUE BAKER AND
CHARLES W. MOONEY
BY
ATTORNEY.

Patented Nov. 25, 1941

2,264,157

UNITED STATES PATENT OFFICE 2,264,157

LOADING AND UNLOADING DEVICE

True Baker and Charles W. Mooney, Shawnee, Okla.

Application November 6, 1939, Serial No. 302,996

1 Claim. (Cl. 214—83)

This invention relates in general to loading and unloading mechanism and particularly to such a mechanism associated with a truck or trailer body as an integral part thereof.

It has been found in actual practice with present day trucks that much time is lost in carrying articles from the front part of the truck to the rear, and vice versa, and for rapidity in loading or unloading at least two men must be employed. It is also true that when a truck is only partly loaded there is danger of the load shifting unless it is secured by some means or other.

With our invention however, only one man is needed for loading and unloading and a movable front wall is provided so that the load will fill the space between the walls and will not shift.

The objects of the invention are, first: to provide in a truck or trailer body, a load receiving floor movable forwardly or rearwardly.

Second: to provide a plurality of vertical rollers along the side walls to prevent friction as the load moves by.

Third: to provide a movable, auxiliary front wall in the truck body, said wall being movable with the floor to provide an interior truck body length to accommodate the load carried with no excess space.

Fourth: to provide a control or actuating means for the movable floor and auxiliary front wall, said control being accessible to and operable by a single operator from the exterior of the truck body and preferably adjacent the rear of the truck.

Other objects and advantages of the invention, as well as its construction and operation will be readily apparent by reference to the following description in connection with the accompanying drawing in which:

Fig. 1 is a top plan view of a truck or trailer body embodying our invention, the top of the body being omitted to facilitate illustration.

Fig. 2 is a longitudinal cross sectional view on the line 2—2 of Fig. 1.

Fig. 3 is a fragmentary, longitudinal, cross-sectional view showing the floor and auxiliary front wall operating mechanism.

Fig. 4 is a fragmentary rear view of the truck body employing our invention.

Referring now to the drawing by numerals of reference, I designates a truck or trailer body having floor 2, front wall 3, sides 4 and top 5. Suitable hinged end gate or wall means 6 may be provided.

The movable floor comprises a plurality of rollers 7, journaled in angle iron supports 8 or other suitable means secured to the floor 2. A wide belt 9 of canvas, leather or other suitable flexible material rides on the rollers and has one end 10 secured to the floor 11 of the auxiliary front wall movable portion 12. The other end of the belt 9 passes through slot or opening 13 in truck floor 2, around idler roller 14 and is secured to roller 15 on which it may be wound. Suitable driving means for the roller 15 may be provided, such as gear 16 and worm 17 operable by a removable crank 18.

The floor 11 of the auxiliary front wall movable portion 12 may rest on suitable rollers 19 carried by floor 2. Cables 20 may be secured to each side of the floor 11 and pass around front pulleys 21 and 22, rear pulleys 23 and 24 and are wound on dual cable drums 25 which are positioned on and rotatable with roller 15 on which belt 9 is wound.

The side walls 4 of the truck body carry a plurality of closely spaced, vertical rollers 26, mounted for free rotative movement in angle iron supports 27.

From the foregoing it will be seen that when loading operations are commenced, the auxiliary front wall 12 may be moved to the rear of the truck to the position shown in dotted lines in Fig. 3. This is accomplished by applying crank 18, and rotating worm 17 and gear 16 to actuate cable drums 25 and roller 15 and flexible floor or belt 9 and cables 20.

After all available space is filled the crank is again manipulated and more floor space is made available. It is during movement of the loaded flexible floor that the side wall rollers 26 come into play. Should the load or any portion of it bear against solid side walls, the friction encountered in attempting to move the load would be tremendous. Freely movable rollers, however, minimize this friction to where the flexible floor and its load can easily be moved at will.

In unloading the reverse procedure is used. A portion of the load is removed and the crank manipulated to bring more of the load within reaching distance of the unloader.

In present day trucking operations at wholesale firms, warehouses, truck lines, etc., it is common practice to make numerous stops on a run and unload a portion of the load at each stop. In present practice it is necessary after removing part of the load, to either distribute the balance of the load or secure it by rope or other means to prevent it from jostling around and becoming damaged. Ofttimes these precautions are not taken and miles of travel on the streets and highways cause damage to merchandise.

With our invention, however, after each unloading of a portion of the load, the crank is manipulated and the auxiliary front wall moved rearwardly to eliminate the excess space made available by the removed cargo. Thus, the load will aways be held securely in position and prevented from shifting during movement of the vehicle.

Obviously, changes in form, proportion and details of construction may be resorted to without departing from the spirit of our invention and we reserve all rights to such changes as come within the scope of this specification and the following claim.

What we claim as new and desire to secure by Letters Patent is:

A truck loading and unloading device comprising a plurality of floor rollers, a load receiving belt on the rollers, a plurality of freely rotatable, vertical rollers positioned along the side walls of the truck for preventing friction between the load and the side walls, and means for rolling up and unrolling the belt to shift the load carried thereby, said side wall rollers being positioned in staggered relation to the floor rollers.

TRUE BAKER.
CHARLES W. MOONEY.